(12) United States Patent
Wakimoto et al.

(10) Patent No.: US 11,133,545 B2
(45) Date of Patent: Sep. 28, 2021

(54) PRISMATIC SECONDARY BATTERY AND METHOD FOR MANUFACTURING SAME

(71) Applicant: SANYO Electric Co., Ltd., Daito (JP)

(72) Inventors: Ryoichi Wakimoto, Hyogo (JP); Hiroshi Takabayashi, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 69 days.

(21) Appl. No.: 16/209,408

(22) Filed: Dec. 4, 2018

(65) Prior Publication Data

US 2019/0181394 A1 Jun. 13, 2019

(30) Foreign Application Priority Data

Dec. 12, 2017 (JP) .............................. JP2017-237305

(51) Int. Cl.
*H01M 50/00* (2021.01)
*H01M 50/103* (2021.01)
*H01M 10/0587* (2010.01)
*H01M 10/04* (2006.01)
*H01M 50/10* (2021.01)
*H01M 50/15* (2021.01)
*H01M 50/172* (2021.01)
*H01M 50/531* (2021.01)
*H01M 50/543* (2021.01)
*H01M 50/538* (2021.01)

(52) U.S. Cl.
CPC ..... *H01M 50/103* (2021.01); *H01M 10/0413* (2013.01); *H01M 10/0431* (2013.01); *H01M 10/0587* (2013.01); *H01M 50/10* (2021.01); *H01M 50/15* (2021.01); *H01M 50/172* (2021.01); *H01M 50/531* (2021.01); *H01M 50/543* (2021.01); *H01M 50/538* (2021.01); *H01M 2220/20* (2013.01)

(58) Field of Classification Search
CPC .. H01M 2/0217; H01M 2/024; H01M 2/0473; H01M 10/0431; H01M 10/0587
See application file for complete search history.

(56) References Cited

U.S. PATENT DOCUMENTS 8,232,002 B2 * 7/2012 Yamauchi ........... H01M 50/528
429/185
2011/0159356 A1 6/2011 Tozuka et al.
(Continued)

FOREIGN PATENT DOCUMENTS

JP 2017-59553 A 3/2017

*Primary Examiner* — Cynthia H Kelly
*Assistant Examiner* — Monique M Wills
(74) *Attorney, Agent, or Firm* — Westerman, Hattori, Daniels & Adrian, LLP

(57) ABSTRACT

A prismatic secondary battery includes an electrode body having a positive electrode plate and a negative electrode plate, a prismatic outer casing accommodating the electrode body, a sealing plate sealing the opening of the prismatic outer casing, a negative electrode terminal attached to the sealing plate, and a negative electrode collector electrically connecting the negative electrode plate and the negative electrode terminal. An insulating member is disposed between the sealing plate and the negative electrode terminal. An insulating sheet is disposed between the sealing plate and the negative electrode collector. The insulating member and the insulating sheet are disposed so as to overlap with each other in a direction perpendicular to the sealing plate.

17 Claims, 12 Drawing Sheets

(56) References Cited

U.S. PATENT DOCUMENTS

| | | | |
|---|---|---|---|
| 2015/0364732 A1* | 12/2015 | Kim | H01M 50/183 |
| | | | 429/179 |
| 2016/0043381 A1* | 2/2016 | Byun | H01M 50/578 |
| | | | 429/61 |
| 2016/0099457 A1 | 4/2016 | Park et al. | |

* cited by examiner

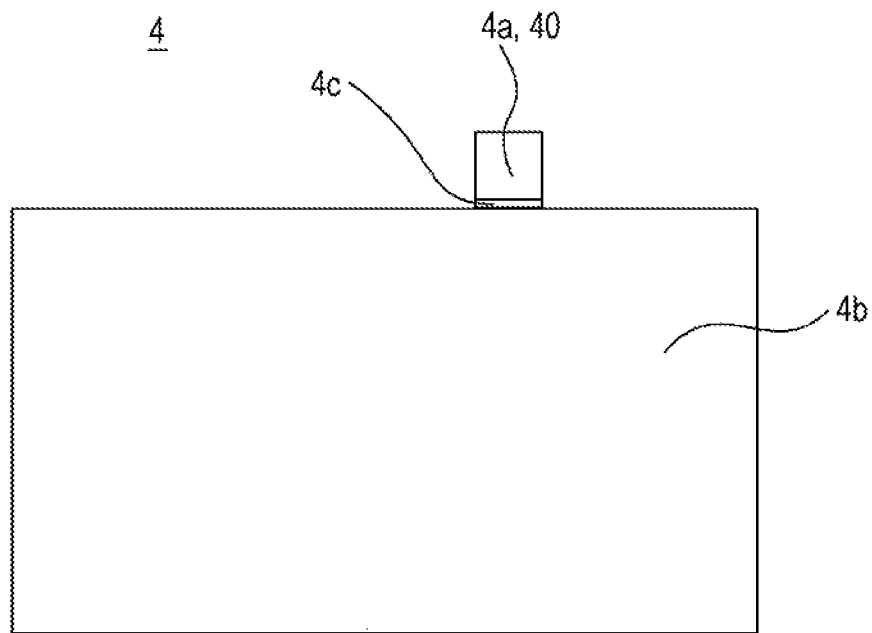
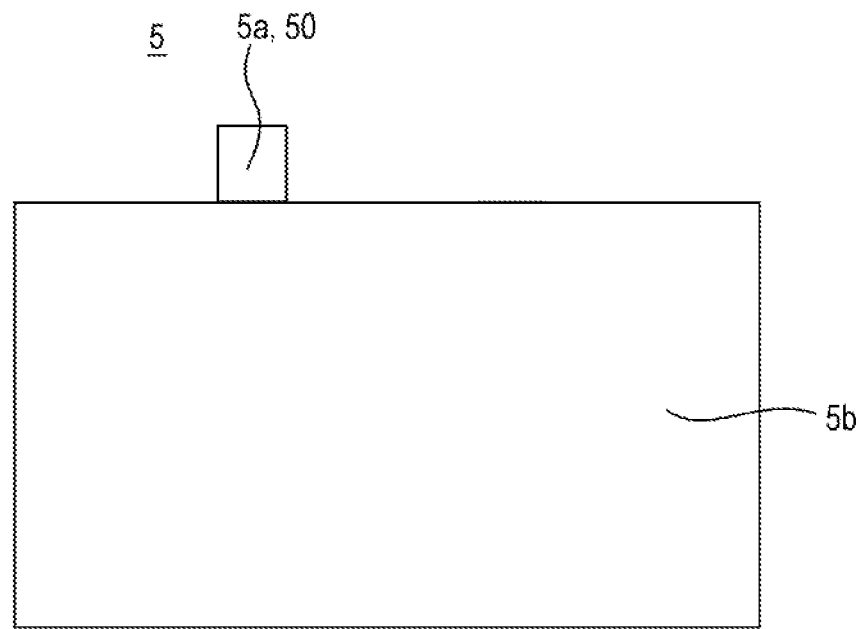

PRISMATIC SECONDARY BATTERY AND METHOD FOR MANUFACTURING SAME

CROSS REFERENCE TO RELATED APPLICATIONS

The present invention application claims priority to Japanese Patent Application No. 2017-237305 filed in the Japan Patent Office on Dec. 12, 2017, the entire contents of which are incorporated herein by reference.

BACKGROUND OF THE INVENTION

Field of the Invention

The present invention relates to a prismatic secondary battery and a method for manufacturing the same.

Description of Related Art

Prismatic secondary batteries such as alkaline secondary batteries and nonaqueous electrolyte secondary batteries are used in power sources for driving electric vehicles (EV), hybrid electric vehicles (HEV, PHEV), and the like. In these prismatic secondary batteries, a battery case is formed by a bottomed tubular prismatic outer casing having an opening and a sealing plate that seals the opening. An electrode body including positive electrode plates, negative electrode plates, and separators is accommodated in the battery case together with an electrolyte. A positive electrode terminal and a negative electrode terminal are attached to the sealing plate.

The positive electrode terminal is electrically connected to the positive electrode plate through a positive electrode collector, and the negative electrode terminal is electrically connected to the negative electrode plate through a negative electrode collector.

In such prismatic secondary batteries, an insulating member made of resin is disposed between the sealing plate and the positive electrode collector or between the sealing plate and the negative electrode collector so that the sealing plate is not in direct contact with the positive electrode collector or the negative electrode collector (Japanese Published Unexamined Patent Application No. 2017-59553 (Patent Document 1)).

BRIEF SUMMARY OF THE INVENTION

It is an object of the present invention to provide a highly reliable prismatic secondary battery in which a sealing plate and a collector are more reliably insulated from each other.

In an aspect of the present invention, a prismatic secondary battery includes an electrode body having a positive electrode plate and a negative electrode plate, an outer casing having an opening and accommodating the electrode body, a sealing plate sealing the opening, a terminal attached to the sealing plate, and a collector electrically connecting the positive electrode plate or the negative electrode plate and the terminal. An insulating member is disposed between the sealing plate and the terminal. An insulating sheet is disposed between the sealing plate and the collector. The insulating member and the insulating sheet are disposed so as to overlap with each other in a direction perpendicular to the sealing plate.

By disposing an insulating sheet between the sealing plate and the collector, the sealing plate and the collector can be prevented from being electrically connected to each other in a simpler manner. However, the inventors found that such a prismatic secondary battery has the following problems.

Fibrous conductive foreign matter may enter the battery case. There is a possibility that such fibrous conductive foreign matter enters between the insulating member disposed between the sealing plate and the terminal and the insulating sheet, and the collector and the sealing plate are electrically connected to each other through the fibrous conductive foreign matter. When the battery case and the collector have different polarities, a short circuit between the positive and negative electrodes occurs when the sealing plate and the collector are electrically connected to each other. Even if the battery case does not have either polarity and is at an intermediate potential, the battery case may be corroded by electrical connection between the collector having one polarity and the sealing plate.

According to the configuration of the prismatic secondary battery of this aspect of the present invention, since an insulating sheet is disposed between the sealing plate and the collector, the sealing plate and the collector can be insulated from each other in a simpler manner. Furthermore, since the insulating member and the insulating sheet are disposed so as to overlap with each other in a direction perpendicular to the sealing plate, if fibrous conductive foreign matter enters the battery case, the sealing plate and the collector can be prevented more reliably from being electrically connected to each other.

In another aspect of the present invention, a method for manufacturing a prismatic secondary battery is provided. The prismatic secondary battery includes an electrode body having a positive electrode plate and a negative electrode plate, an outer casing having an opening and accommodating the electrode body, a sealing plate sealing the opening, a terminal attached to the sealing plate, and a collector electrically connecting the positive electrode plate or the negative electrode plate and the terminal. An insulating member is disposed between the sealing plate and the terminal. The method includes an insulating sheet disposing step of disposing an insulating sheet such that the insulating member and the insulating sheet overlap with each other in a direction perpendicular to the sealing plate, and a collector attaching step of connecting the collector to the terminal such that the insulating sheet is disposed between the sealing plate and the collector.

The present invention can provide a highly reliable prismatic secondary battery.

BRIEF DESCRIPTION OF THE SEVERAL VIEWS OF THE DRAWINGS

FIG. 3 is a plan view of a positive electrode plate according to the embodiment.

FIG. 4 is a plan view of a negative electrode plate according to the embodiment.

DETAILED DESCRIPTION OF THE INVENTION

The configuration of a prismatic secondary battery 20 as a prismatic secondary battery according to an embodiment will be described below. It should be noted that the present invention is not limited to the following embodiment.

Figure 1:
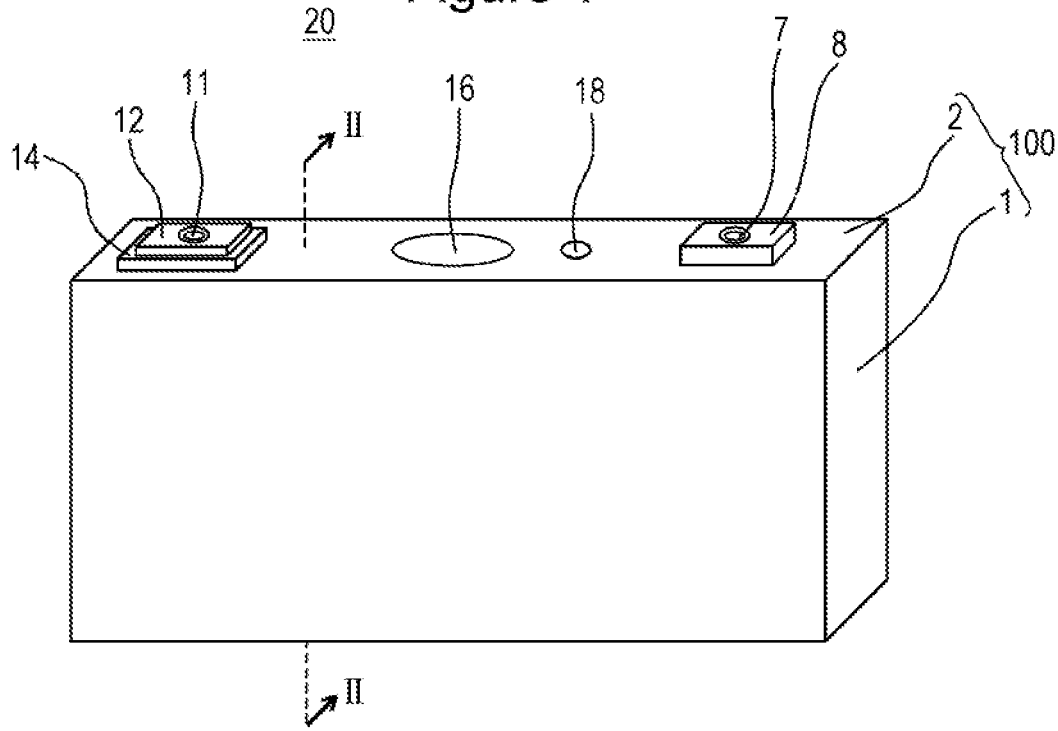
FIG. 1 is a perspective view of a secondary battery according to the embodiment.
Figure 2:
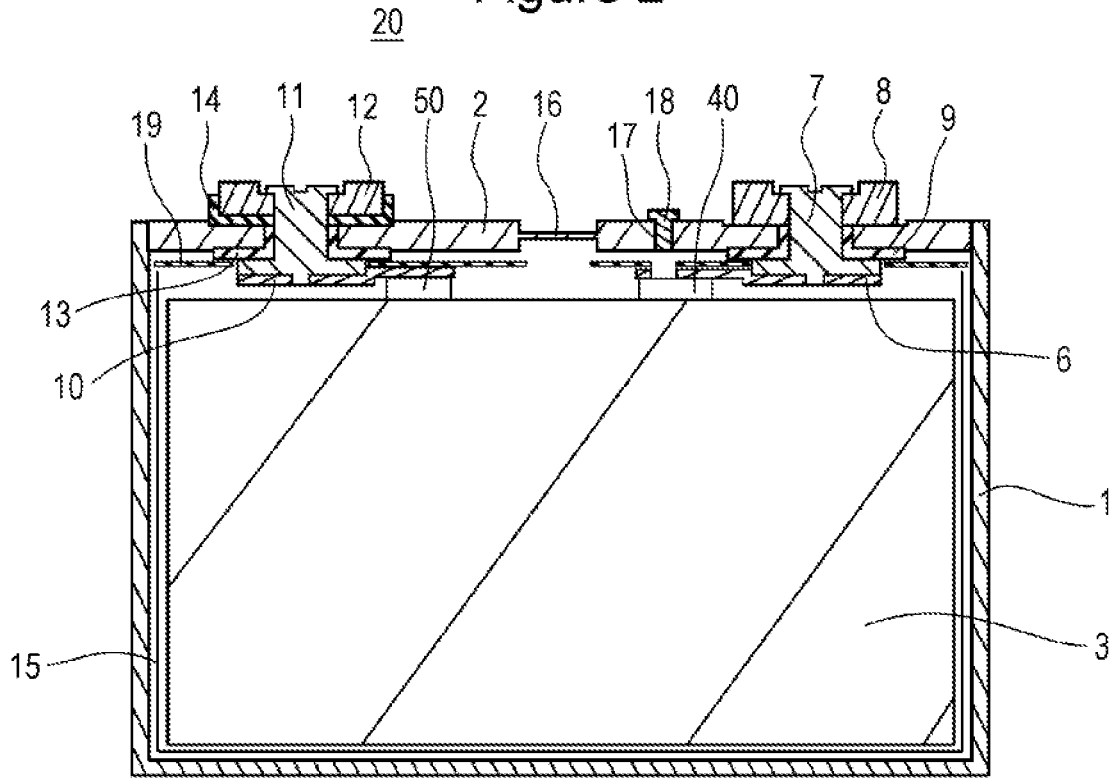
FIG. 2 is a cross-sectional view taken along line II-II of FIG. 1.

As shown in FIGS. 1 and 2, the prismatic secondary battery 20 includes a battery case 100 including a bottomed prismatic outer casing 1 having an opening and a sealing plate 2 that seals the opening of the prismatic outer casing 1. The prismatic outer casing 1 and the sealing plate 2 are preferably made of metal, for example, aluminum or an aluminum alloy. An electrode body 3 in which positive electrode plates and negative electrode plates are stacked with separators interposed therebetween is accommodated in the prismatic outer casing 1 together with an electrolyte. An electrode body holder 15 made of a resin sheet is disposed between the electrode body 3 and the prismatic outer casing 1.

A positive electrode tab 40 and a negative electrode tab 50 are provided at an end of the electrode body 3 on the sealing plate 2 side. The positive electrode tab 40 is electrically connected to a positive electrode terminal 7 and a positive electrode external conductive member 8 through the positive electrode collector 6. The negative electrode tab 50 is electrically connected to a negative electrode terminal 11 and a negative electrode external conductive member 12 through the negative electrode collector 10.

The positive electrode terminal 7 and the positive electrode external conductive member 8 are preferably made of metal, and more preferably made of aluminum or an aluminum alloy. The positive electrode external conductive member 8 is electrically connected to the sealing plate 2. An insulating member 9 made of resin is disposed between the positive electrode terminal 7 and the sealing plate 2.

The negative electrode terminal 11 and the negative electrode external conductive member 12 are preferably made of metal. The negative electrode external conductive member 12 is preferably made of aluminum or an aluminum alloy. The negative electrode terminal 11 is more preferably made of copper or a copper alloy. Alternatively, the negative electrode terminal 11 may have a part made of aluminum or an aluminum alloy and a part made of copper or a copper alloy. In this case, it is preferable to connect the part made of copper or a copper alloy to the negative electrode collector 10 and connect the part made of aluminum or an aluminum alloy to the negative electrode external conductive member 12. An insulating member 13 is disposed between the sealing plate 2 and the negative electrode terminal 11. An outer side insulating member 14 is disposed between the sealing plate 2 and the negative electrode external conductive member 12.

Between the sealing plate 2 and the electrode body 3, an insulating sheet 19 made of resin is disposed so as to face the sealing plate 2. The insulating sheet 19 is disposed between the sealing plate 2 and the positive electrode collector 6. The insulating sheet 19 is disposed between the sealing plate 2 and the negative electrode collector 10.

The sealing plate 2 is provided with a gas discharge valve 16 that breaks when the pressure in the battery case 100 reaches a predetermined value or more and discharges the gas in the battery case 100 to the outside of the battery case 100. An electrolyte injection hole 17 is provided in the sealing plate 2. After electrolyte is injected into the battery case 100 through the electrolyte injection hole 17, the electrolyte injection hole 17 is sealed by a sealing member 18.

Next, a method for manufacturing the prismatic secondary battery 20 and details of each component will be described.

Positive Electrode Plate

FIG. 3 is a plan view of a positive electrode plate 4. The positive electrode plate 4 has a main body portion in which a positive electrode active material mixture layers 4b containing a positive electrode active material is formed on both sides of a rectangular positive electrode substrate 4a. The positive electrode substrate 4a protrudes from the edge of the main body portion, and the protruded positive electrode substrate 4a forms the positive electrode tab 40. The positive electrode tab 40 may be a part of the positive electrode substrate 4a as shown in FIG. 3, or another member may be connected to the positive electrode substrate 4a to serve as the positive electrode tab 40. A part of the positive electrode tab 40 that is adjacent to the positive electrode active material mixture layer 4b is preferably provided with a positive electrode protective layer 4c having an electrical resistance higher than the electrical resistance of the positive electrode active material mixture layer 4b. As the positive electrode substrate 4a, a metal foil such as an aluminum foil or an aluminum alloy foil is preferably used. As the positive electrode active material, lithium transition metal complex oxide or the like is preferably used.

Negative Electrode Plate

FIG. 4 is a plan view of a negative electrode plate 5. The negative electrode plate 5 has a main body portion in which a negative electrode active material mixture layer 5b containing a negative electrode active material is formed on both sides of a rectangular negative electrode substrate 5a. The negative electrode substrate 5a protrudes from the edge of the main body portion, and the protruded negative electrode substrate 5a forms a negative electrode tab 50. The negative electrode tab 50 may be a part of the negative electrode substrate 5a as shown in FIG. 4, or another member may be connected to the negative electrode substrate 5a to serve as the negative electrode tab 50. As the negative electrode substrate 5a, a metal foil such as a copper foil or a copper alloy foil is preferably used. As the negative electrode active material, a carbon material, a silicon material, or the like is preferably used.

Figure 5:
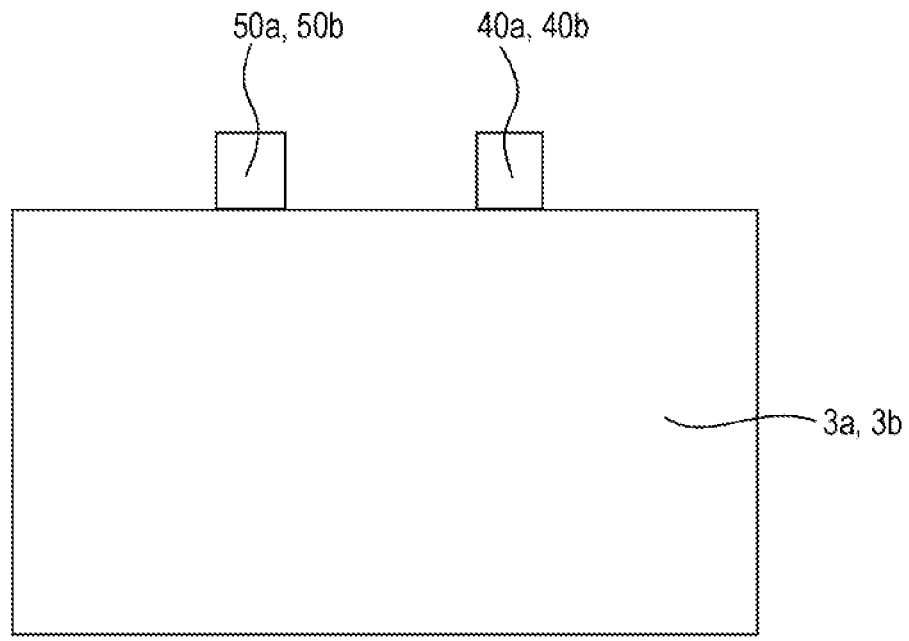
FIG. 5 is a plan view of an electrode body element according to the embodiment.

Fabrication of Electrode Body Element 50 positive electrode plates 4 and 51 negative electrode plates 5 are fabricated by the above-described method, and these are stacked with rectangular polyolefin separators therebetween to fabricate a stacked electrode body element (first electrode body element 3a, second electrode body element 3b). As shown in FIG. 5, a stacked electrode body element (first electrode body element 3a, second electrode body element 3b) has, at one end thereof, a positive electrode tab group in which positive electrode tabs 40 of positive electrode plates 4 are stacked (first positive electrode tab group 40a, second positive electrode tab group 40b), and a negative electrode tab group in which negative electrode tabs 50 of negative electrode plates 5 are stacked (first negative electrode tab group 50a, second negative electrode tab group 50b). Separators are disposed on both outer surfaces of the electrode body element, and the electrode plates and the separators can be fixed in a stacked state with a tape or the like. Alternatively, an adhesive layer may be provided on each separator so that the separators and the positive electrode plates 4, and the separators and the negative electrode plates 5 are adhered to each other.

The size in plan view of the separators is preferably the same as that of the negative electrode plates 5 or larger than that of the negative electrode plates 5. Each positive electrode plate 4 or each negative electrode plate 5 may be disposed between two separators, and after heat welding the peripheries of the separators, the positive electrode plates 4 and the negative electrode plates 5 may be stacked. It is also possible to roll a belt-like positive electrode plate and a belt-like negative electrode plate with a belt-like separator therebetween to form a rolled electrode body element.

Connecting Collector and Tab

Two electrode body elements are fabricated by the above-described method, and are respectively referred to as a first electrode body element 3a and a second electrode body element 3b. The first electrode body element 3a and the second electrode body element 3b may have exactly the same configuration or different configurations. Here, the plurality of positive electrode tabs 40 of the first electrode body element 3a form a first positive electrode tab group 40a. The plurality of negative electrode tabs 50 of the first electrode body element 3a form a first negative electrode tab group 50a. The plurality of positive electrode tabs 40 of the second electrode body element 3b form a second positive electrode tab group 40b. The plurality of negative electrode tabs 50 of the second electrode body element 3b form a second negative electrode tab group 50b.

Figure 6:
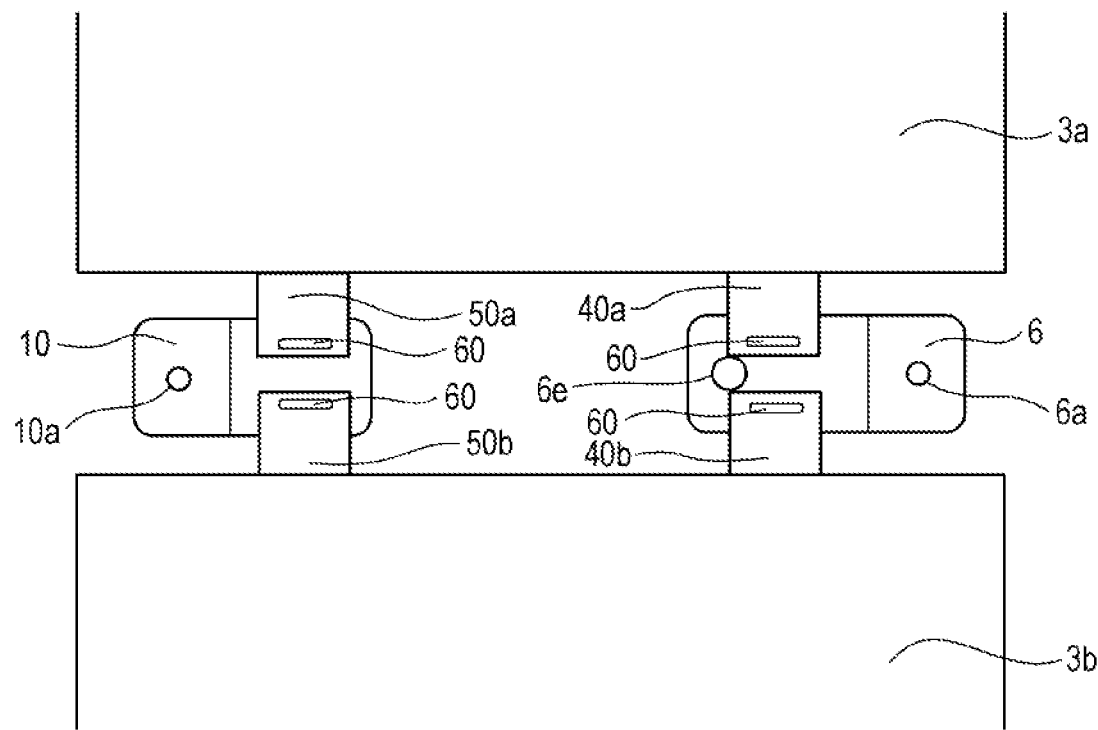
FIG. 6 shows a state in which positive electrode tab groups are connected to a positive electrode collector and negative electrode tab groups are connected to a negative electrode collector.

FIG. 6 shows a state in which the first positive electrode tab group 40a and the second positive electrode tab group 40b are connected to the positive electrode collector 6 and the first negative electrode tab group 50a and the second negative electrode tab group 50b are connected to the negative electrode collector 10. The positive electrode collector 6 and the negative electrode collector 10 are disposed between the first electrode body element 3a and the second electrode body element 3b. Then, the first positive electrode tab group 40a and the second positive electrode tab group 40b are disposed on the positive electrode collector 6. The first negative electrode tab group 50a and the second negative electrode tab group 50b are disposed on the negative electrode collector 10. The first positive electrode tab group 40a and the second positive electrode tab group 40b are welded and connected to the positive electrode collector 6, so that welded portions 60 are formed. The first negative electrode tab group 50a and the second negative electrode tab group 50b are welded and connected to the negative electrode collector 10, so that welded portions 60 are formed. The welding method is preferably ultrasonic welding or resistance welding. It is also possible to connect by laser welding. In the positive electrode collector 6, a collector opening 6e is provided at a position facing the electrolyte injection hole 17.

Attaching Parts to Sealing Plate

Figure 7A:
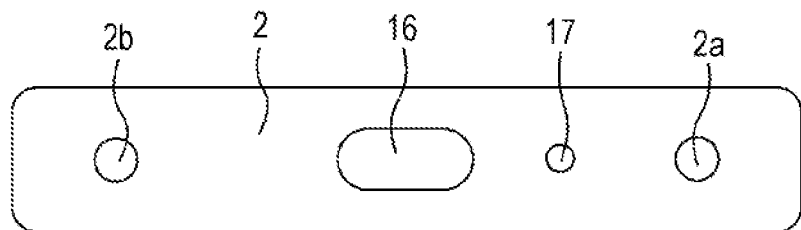
FIG. 7A shows the surface of a sealing plate on the electrode body side.
Figure 7B:
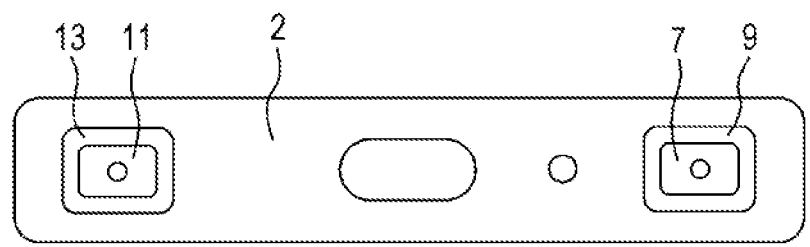
FIG. 7B shows a state after an insulating member, a positive electrode terminal, and a negative electrode terminal are attached to the sealing plate.

A method for attaching the members to the sealing plate will be described with reference to FIGS. 7A to 7C. As shown in FIG. 7A, the sealing plate 2 has a positive electrode terminal mounting hole 2a and a negative electrode terminal mounting hole 2b.

The positive electrode external conductive member 8 is disposed on the battery outer surface side around the positive electrode terminal mounting hole 2a, and the inner side insulating member 9 is disposed on the battery inner surface side around the positive electrode terminal mounting hole 2a. Then, the positive electrode terminal 7 is inserted from the battery inner surface side into the through-hole of the insulating member 9, the positive electrode terminal mounting hole 2a, and the through-hole of the positive electrode external conductive member 8. Then, by caulking the tip of the positive electrode terminal 7, the positive electrode terminal 7 is attached to the sealing plate 2 as shown in FIGS. 2 and 7B. The outer side insulating member 14 and the negative electrode external conductive member 12 are disposed on the battery outer surface side around the negative electrode terminal mounting hole 2b, and the insulating member 13 is disposed on the battery inner surface side around the negative electrode terminal mounting hole 2b. Then, the negative electrode terminal 11 is inserted from the battery inner surface side into the through-hole of the insulating member 13, the negative electrode terminal mounting hole 2b, the through-hole of the outer side insulating member 14, and the through-hole of the negative electrode external conductive member 12. Then, by caulking the tip of the negative electrode terminal 11, the negative electrode terminal 11 is attached to the sealing plate 2.

Figure 7C:
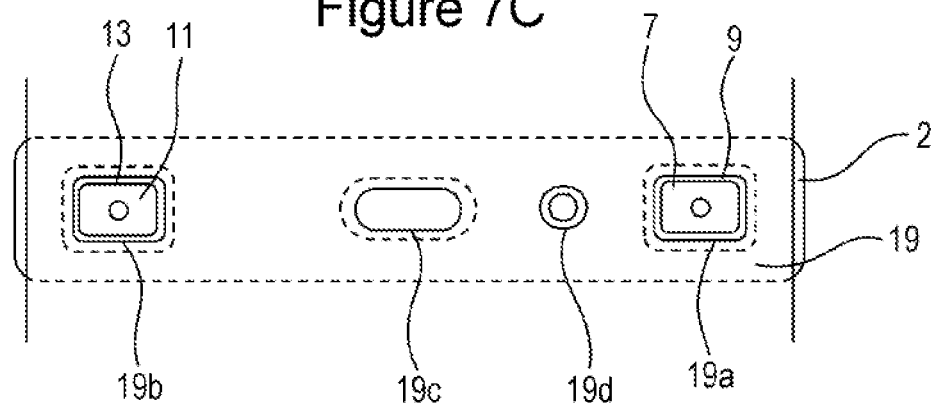
FIG. 7C shows a state in which an insulating sheet is disposed on the electrode body side of the sealing plate.

Thereafter, as shown in FIG. 7C, the insulating sheet 19 is disposed so as to face the battery inner surface of the sealing plate 2. The insulating sheet 19 has a first opening 19a, a second opening 19b, a third opening 19c, and a fourth opening 19d. The first opening 19a is disposed at a position corresponding to the positive electrode terminal 7. The second opening 19b is disposed at a position corresponding to the negative electrode terminal 11. The third opening 19c is disposed at a position corresponding to the gas discharge valve 16. The fourth opening 19d is disposed at a position corresponding to the electrolyte injection hole 17.

Connecting Terminal and Collector

Figure 8:
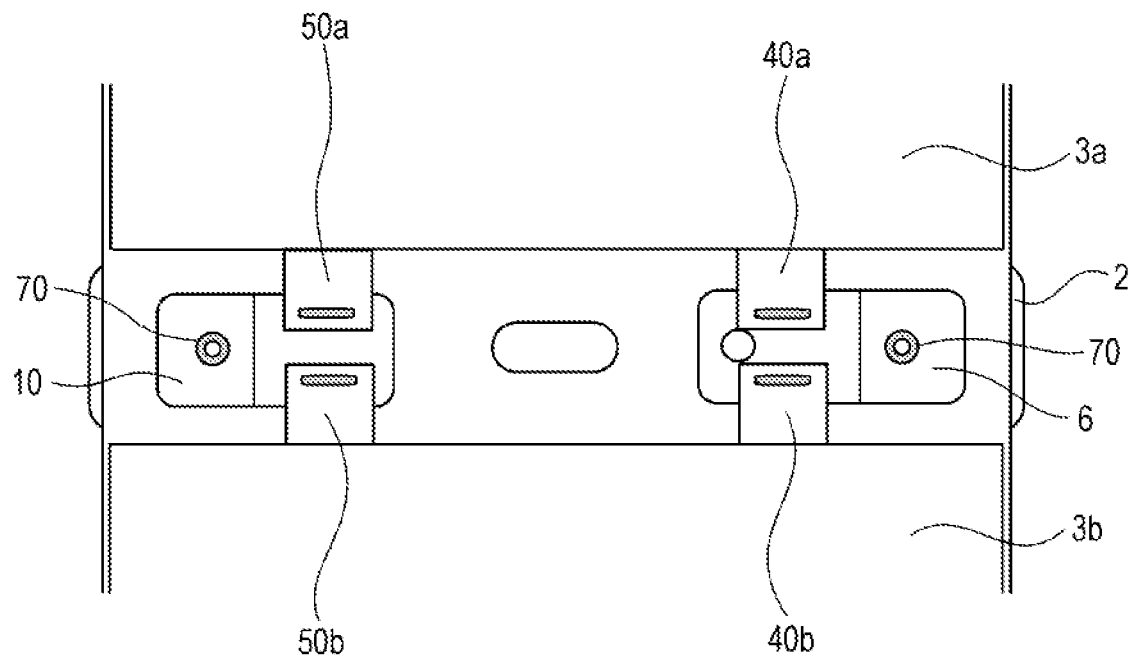
FIG. 8 shows a state in which the positive electrode collector is connected to the positive electrode terminal and the negative electrode collector is connected to the negative electrode terminal.

As shown in FIGS. 2 and 8, the positive electrode collector 6 and the positive electrode terminal 7 are connected, and the negative electrode collector 10 and the negative electrode terminal 11 are connected. A connection protrusion 7d provided in a flange portion 7a of the positive electrode terminal 7 is disposed in a connection hole 6a provided in the positive electrode collector 6, and the positive electrode collector 6 and the positive electrode terminal 7 are welded by laser welding or the like to form a welded portion 70. A connection protrusion 11d provided in a flange portion 11a of the negative electrode terminal 11 is disposed in a connection hole 10a provided in the negative electrode collector 10, and the negative electrode collector 10 and the negative electrode terminal 11 are welded by laser welding or the like to form a welded portion 70.

Figure 9A:
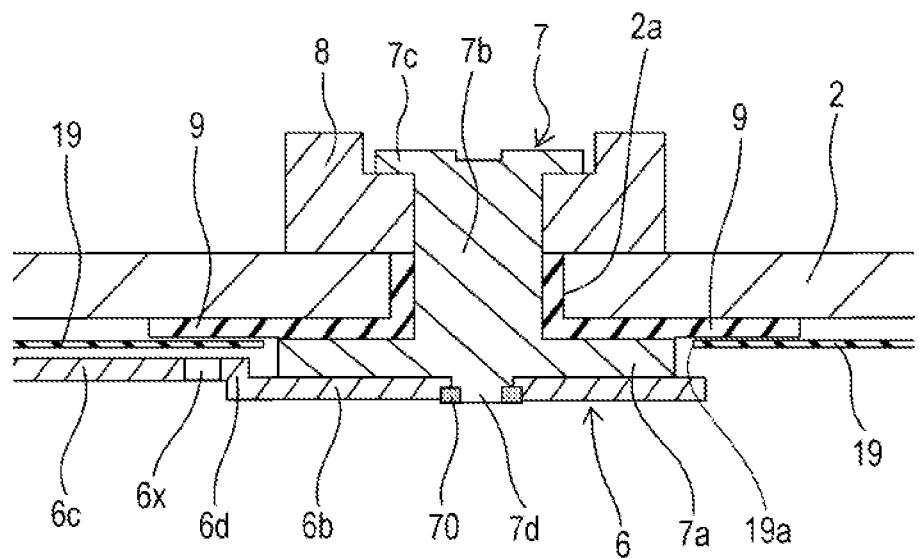
FIG. 9A is a cross-sectional view of the vicinity of the positive electrode terminal taken in the longitudinal direction of the sealing plate.
Figure 9B:
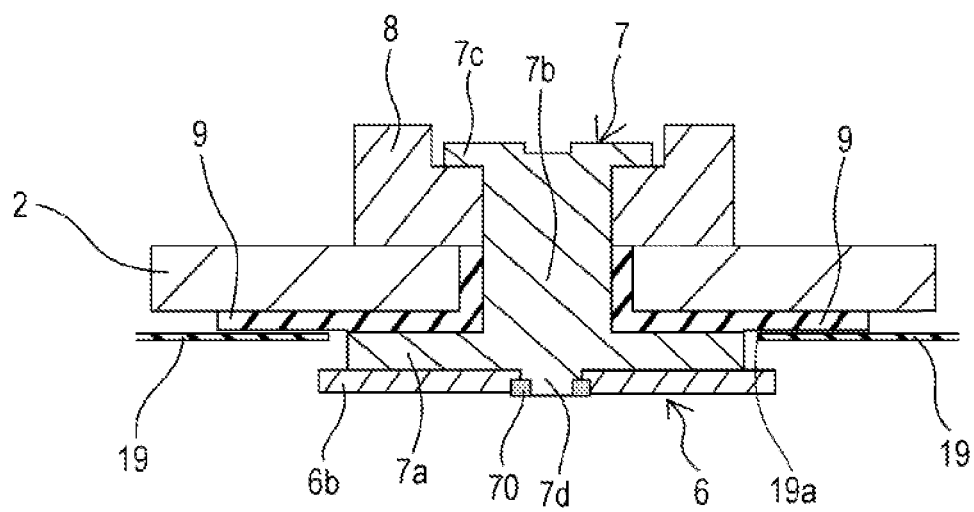
FIG. 9B is a cross-sectional view of the vicinity of the positive electrode terminal taken in the widthwise direction of the sealing plate.

As shown in FIGS. 9A and 9B, the positive electrode terminal 7 has the flange portion 7a disposed closer to the electrode body 3 than the sealing plate 2, and an insertion portion 7b that extends from the flange portion 7a to the outside of the battery and penetrates the positive electrode terminal mounting hole 2a. A caulking portion 7c is provided on the distal end side of the insertion portion 7b. The positive electrode collector 6 has a terminal connecting portion 6b to which the positive electrode terminal 7 is connected, and a tab connecting portion 6c to which the positive electrode tabs 40 (first positive electrode tab group 40a and second positive electrode tab group 40b) are connected. In a direction perpendicular to the sealing plate 2, the distance between the sealing plate 2 and the tab connecting portion 6c is smaller than the distance between the sealing plate 2 and the terminal connecting portion 6b. The terminal connecting portion 6b and the tab connecting portion 6c are connected by a connecting portion 6d.

The insulating sheet 19 is disposed between the sealing plate 2 and the positive electrode collector 6. When viewed from a direction perpendicular to the sealing plate 2, the size of the insulating member 9 is larger than the size of the first opening 19a provided in the insulating sheet 19. Therefore, when viewed from a direction perpendicular to the sealing plate 2, the insulating member 9 and the insulating sheet 19 are disposed so as to overlap with each other.

The positive electrode collector 6 is provided with a fuse portion 6x. The cross-sectional area of the fuse portion 6x is smaller than that of the other part, and the fuse portion 6x blows when a large current flows. The insulating member 9 and the insulating sheet 19 are preferably disposed between the fuse portion 6x and the sealing plate 2. Thereby, after the fuse portion 6x blows, the positive electrode collector 6 and the sealing plate 2 can be prevented more reliably from coming into contact with each other. Therefore, after the fuse portion 6x blows, a conductive path between the positive electrode plate 4 and the positive electrode external conductive member 8 can be prevented from being formed.

Figure 10A:
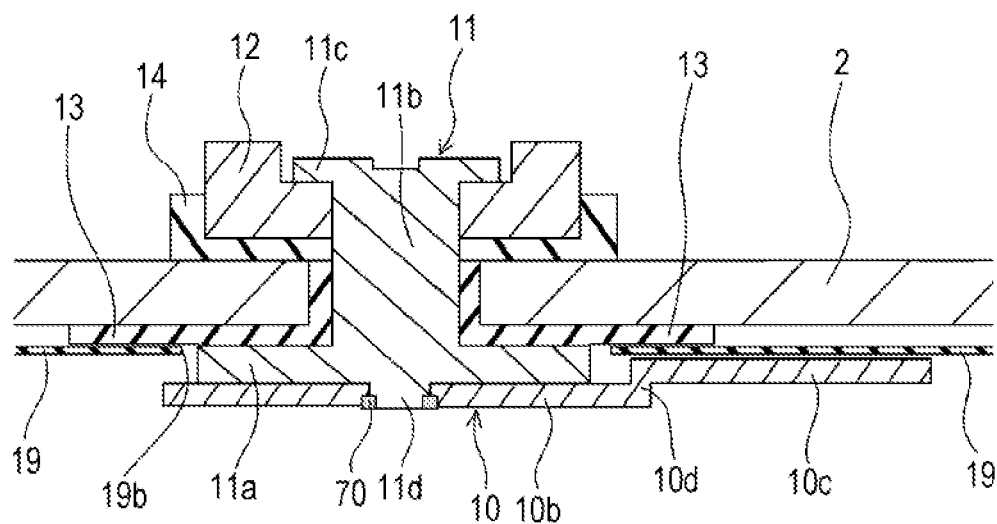
FIG. 10A is a cross-sectional view of the vicinity of the negative electrode terminal taken in the longitudinal direction of the sealing plate.
Figure 10B:
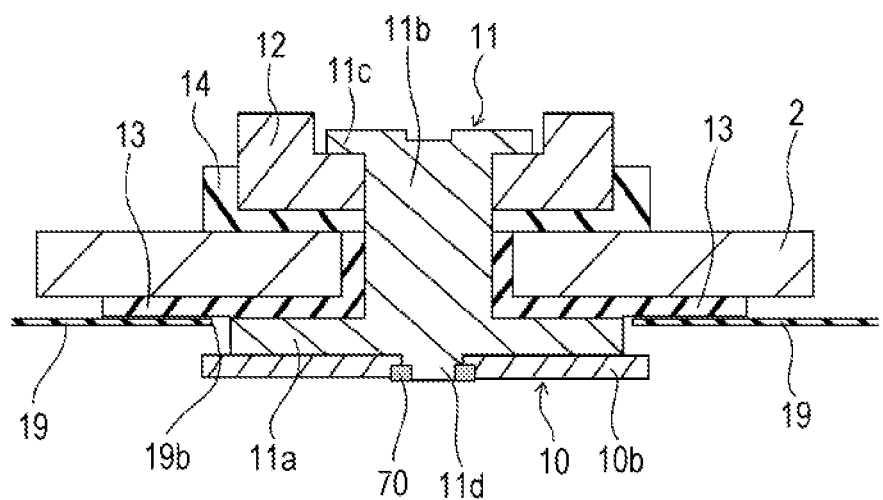
FIG. 10B is a cross-sectional view of the vicinity of the negative electrode terminal taken in the widthwise direction of the sealing plate.

As shown in FIGS. 10A and 10B, the negative electrode terminal 11 has a flange portion 11a disposed closer to the electrode body 3 than the sealing plate 2, and an insertion portion 11b that extends from the flange portion 11a to the outside of the battery and penetrates the negative electrode terminal mounting hole 2b. A caulking portion 11c is provided on the distal end side of the insertion portion 11b. The negative electrode collector 10 has a terminal connecting portion 10b to which the negative electrode terminal 11 is connected, and a tab connecting portion 10c to which the negative electrode tabs 50 (first negative electrode tab group 50a and second negative electrode tab group 50b) are connected. In a direction perpendicular to the sealing plate 2, the distance between the sealing plate 2 and the tab connecting portion 10c is smaller than the distance between the sealing plate 2 and the terminal connecting portion 10b. The terminal connecting portion 10b and the tab connecting portion 10c are connected by a connecting portion 10d.

The insulating sheet 19 is disposed between the sealing plate 2 and the negative electrode collector 10. When viewed from a direction perpendicular to the sealing plate 2, the size of the insulating member 13 is larger than the size of the second opening 19b provided in the insulating sheet 19. Therefore, when viewed from a direction perpendicular to the sealing plate 2, the insulating member 13 and the insulating sheet 19 are disposed so as to overlap with each other. With such a configuration, if fibrous conductive foreign matter enters the battery case 100, the sealing plate 2 and the negative electrode collector 10 can be prevented reliably from being electrically connected to each other through the conductive foreign matter. Therefore, a highly reliable prismatic secondary battery in which the short circuit between the positive electrode and the negative electrode is more reliably prevented is obtained.

Figure 11:
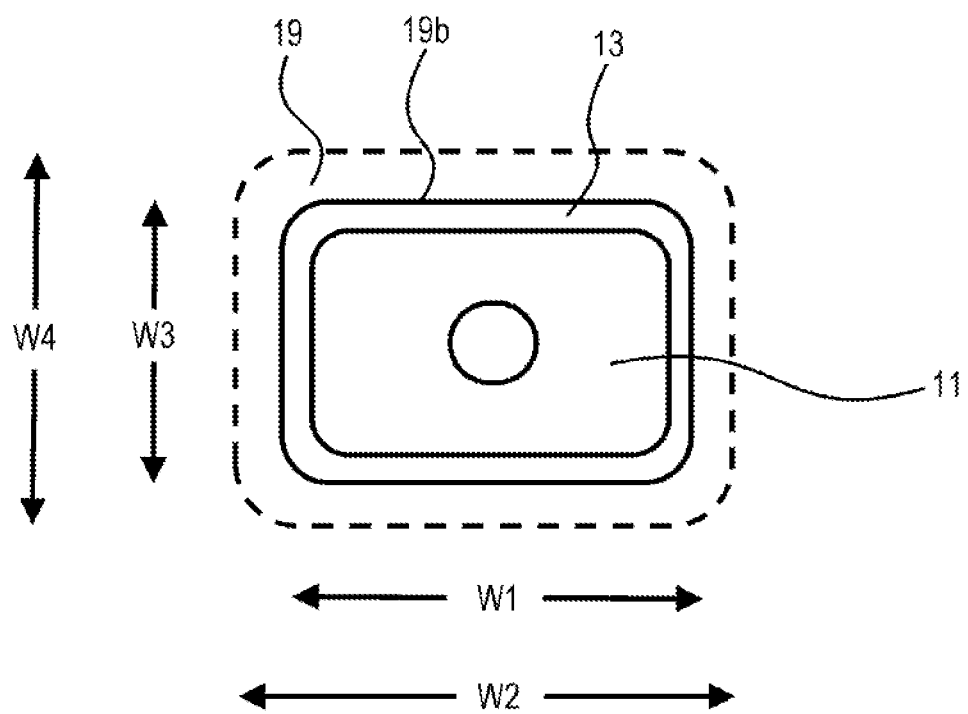
FIG. 11 shows a flange portion of the negative electrode terminal, the insulating member, and the insulating sheet.

As shown in FIG. 11, in the longitudinal direction of the sealing plate 2, the width W2 of the insulating member 13 is larger than the width W1 of the second opening 19b of the insulating sheet 19. In the widthwise direction of the sealing plate 2, the width W4 of the insulating member 13 is larger than the width W3 of the second opening 19b of the insulating sheet 19. The dashed line in FIG. 11 indicates the position of the outer peripheral edge of the insulating member 13.

Fabrication of Electrode Body

The first positive electrode tab group 40a, the second positive electrode tab group 40b, the first negative electrode tab group 50a, and the second negative electrode tab group 50b are curved such that the upper surface of the first electrode body element 3a and the upper surface of the second electrode body element 3b in FIG. 8 are in contact with each other directly or with another member therebetween. Thereby, the first electrode body element 3a and the second electrode body element 3b are integrated to form one electrode body 3. The first electrode body element 3a and the second electrode body element 3b are preferably integrated using a tape or the like. Alternatively, the first electrode body element 3a and the second electrode body element 3b are preferably integrated by being disposed in an electrode body holder 15 formed into a box shape or a bag shape.

When integrating the first electrode element 3a and the second electrode element 3b, the insulating sheet 19 is preferably bent together. Thereby, the first electrode body element 3a or the second electrode body element 3b can be prevented from being damaged. When integrating the first electrode body element 3a and the second electrode body element 3b, a resin insulating plate (not shown) may be disposed between the positive electrode collector 6 and the electrode body 3 and between the negative electrode collector 10 and the electrode body 3.

Figure 12A:
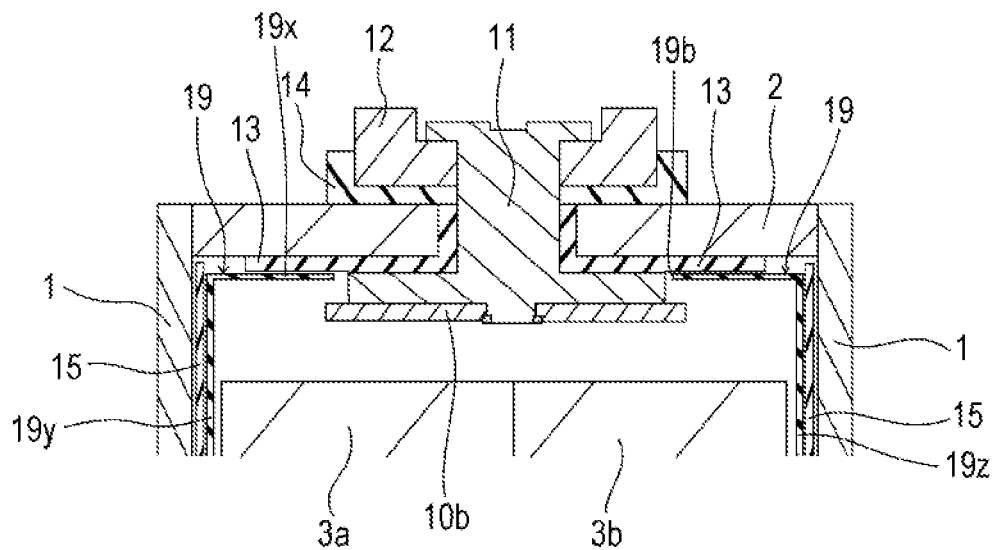
FIG. 12A is a cross-sectional view of the vicinity of the negative electrode terminal taken in the widthwise direction of the sealing plate.
Figure 12B:
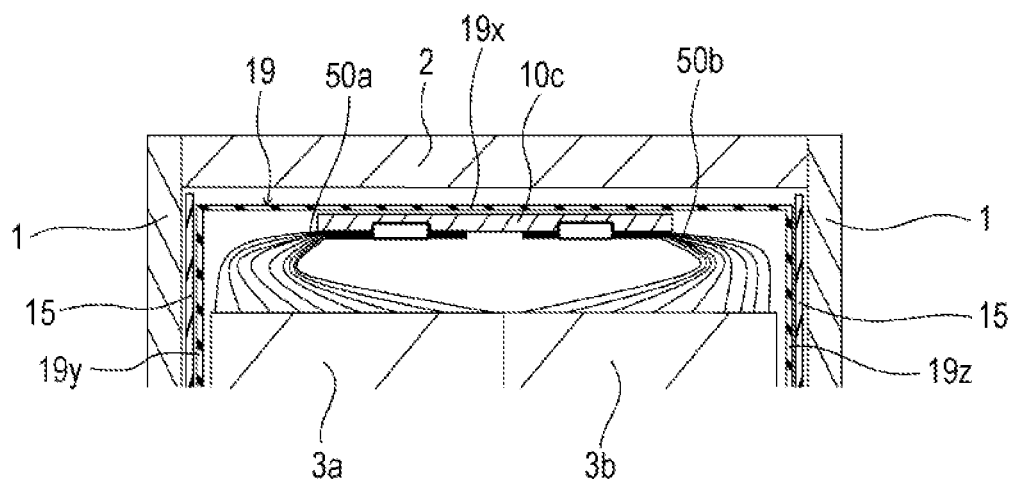
FIG. 12B is a cross-sectional view of the vicinity of the connecting portions between the negative electrode collector and the negative electrode tab groups taken in the widthwise direction of the sealing plate.

As shown in FIGS. 12A and 12B, in the prismatic secondary battery 20, the insulating sheet 19 has a first region 19x disposed along the sealing plate 2, a second region 19y extending from one end of the first region 19x toward the bottom of the prismatic outer casing 1, and a third region 19z extending from the other end of the first region 19x toward the bottom of the prismatic outer casing 1. The second region 19y and the third region 19z are disposed between the side wall of the prismatic outer casing 1 and the electrode body 3.

As shown in FIG. 12B, the first negative electrode tab group 50a and the second negative electrode tab group 50b are connected to the surface of the negative electrode collector 10 on the electrode body 3 side in a state curved in different directions. With such a configuration, a prismatic secondary battery in which the space occupied by the collector in the battery case 100 is reduced and that has a high energy density is obtained.

The insulating sheet 19 is preferably sandwiched at least one of between the insulating member 9 and the positive electrode collector 6 and between the insulating member 13 and the negative electrode collector 10. It is preferable to prevent the movement of the insulating sheet 19 by sandwiching the insulating sheet 19 between the insulating member 9 and the positive electrode collector 6. It is preferable to prevent the movement of the insulating sheet 19 by sandwiching the insulating sheet 19 between the insulating member 13 and the negative electrode collector 10.

The length of the positive electrode collector 6 in the longitudinal direction of the sealing plate 2 is preferably larger than the length of the first opening 19a of the insulating sheet 19 in the longitudinal direction of the sealing plate 2. The length of the negative electrode collector 10 in the longitudinal direction of the sealing plate 2 is preferably larger than the length of the second opening 19b of the insulating sheet 19 in the longitudinal direction of the sealing plate 2. Thereby, the insulating sheet 19 can be prevented from moving to the electrode body 3 side of the positive electrode collector 6 and the negative electrode collector 10.

In a direction perpendicular to the sealing plate 2, the thickness of the insulating sheet 19 is preferably smaller than the thickness of the insulating member 9 and the insulating member 13.

Modification 1

Figure 13A:
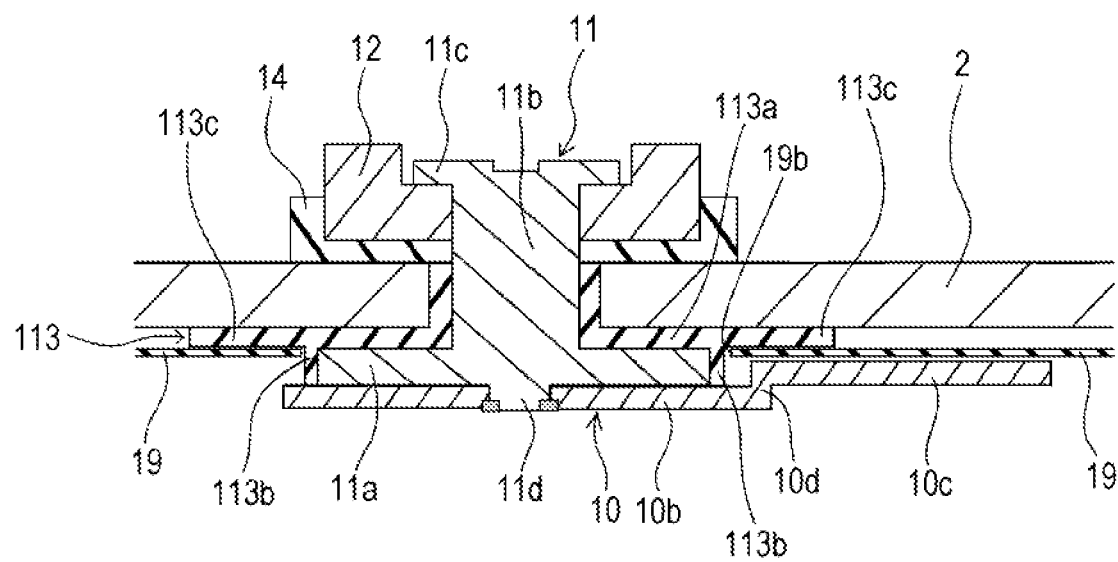
FIG. 13A is a cross-sectional view of the vicinity of the negative electrode terminal in a prismatic secondary battery according to Modification 1 taken in the longitudinal direction of the sealing plate.
Figure 13B:
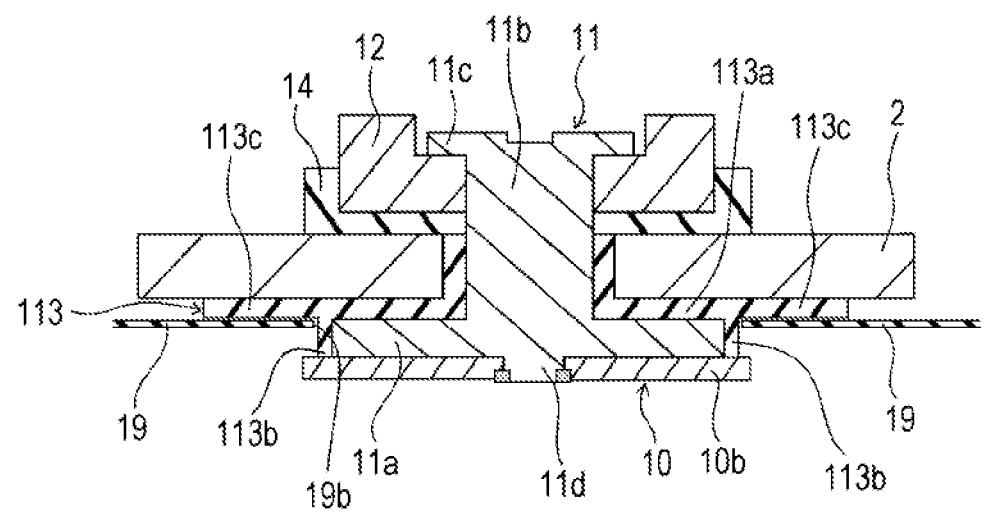
FIG. 13B is a cross-sectional view of the vicinity of the negative electrode terminal in the prismatic secondary battery according to Modification 1 taken in the widthwise direction of the sealing plate.

FIGS. 13A and 13B are views corresponding to FIGS. 10A and 10B of a prismatic secondary battery according to Modification 1. The prismatic secondary battery according to Modification 1 differs from the prismatic secondary battery 20 according to the above embodiment only in the shape of the insulating member.

As shown in FIGS. 13A and 13B, the insulating member 113 disposed between the sealing plate 2 and the negative electrode terminal 11 has a base portion 113a and a wall portion 113b protruding from the base portion 113a toward the electrode body 3. The insulating member 113 further has an outer peripheral portion 113c outside the wall portion 113b. When viewed from a direction perpendicular to the sealing plate 2, the outer peripheral portion 113c and the insulating sheet 19 are disposed so as to overlap with each other.

Modification 2

Figure 14A:
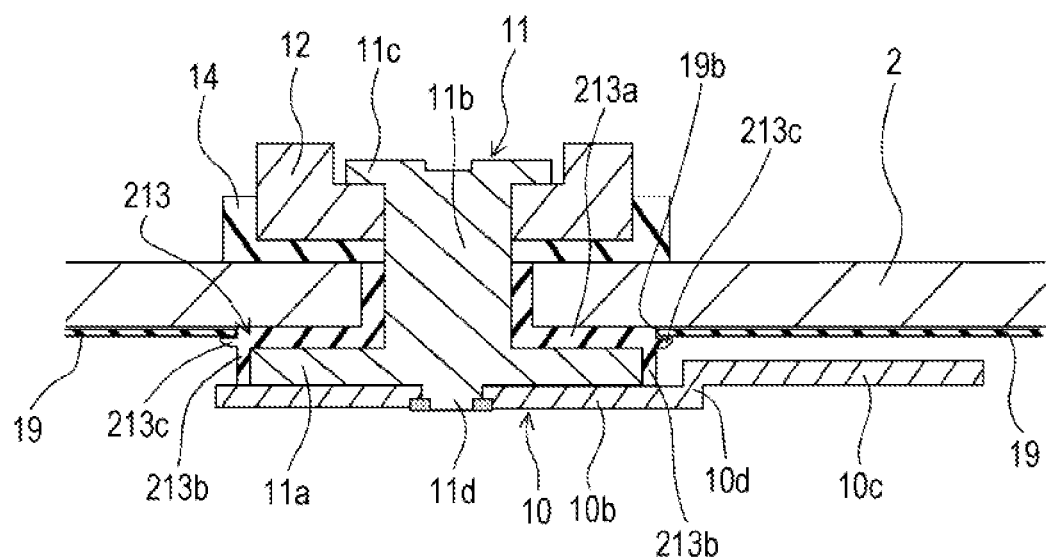
FIG. 14A is a cross-sectional view of the vicinity of the negative electrode terminal in a prismatic secondary battery according to Modification 2 taken in the longitudinal direction of the sealing plate.
Figure 14B:
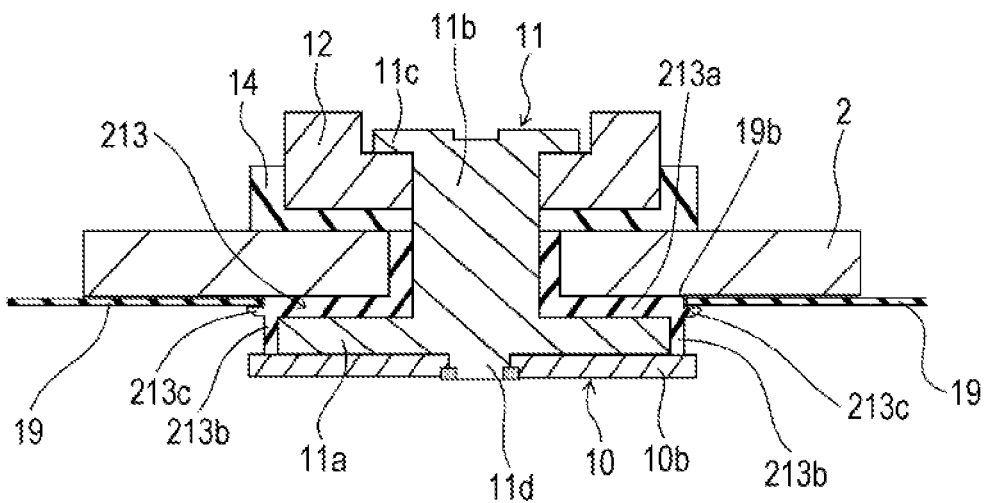
FIG. 14B is a cross-sectional view of the vicinity of the negative electrode terminal in the prismatic secondary battery according to Modification 2 taken in the widthwise direction of the sealing plate.

FIGS. 14A and 14B are views corresponding to FIGS. 10A and 10B of a prismatic secondary battery according to Modification 2. The prismatic secondary battery according to Modification 1 differs from the prismatic secondary battery 20 according to the above embodiment only in the shape of the insulating member.

As shown in FIGS. 14A and 14B, the insulating member 213 disposed between the sealing plate 2 and the negative electrode terminal 11 has a base portion 213a and a wall portion 213b protruding from the base portion 213a toward the electrode body 3. A protruding portion 213c is provided outside the wall portion 213b. The insulating sheet 19 is disposed between the sealing plate 2 and the protruding portion 213c.

By appropriately adjusting the size of the protruding portion 213c, after attaching the insulating member 213 and the negative electrode terminal 11 to the sealing plate 2, the insulating sheet 19 can be disposed between the sealing plate 2 and the protruding portion 213c. That is, the periphery of the second opening 19b of the insulating sheet 19 is deformed, and the insulating sheet 19 is disposed between the sealing plate 2 and the protruding portion 213c.

Modification 3

Figure 15:
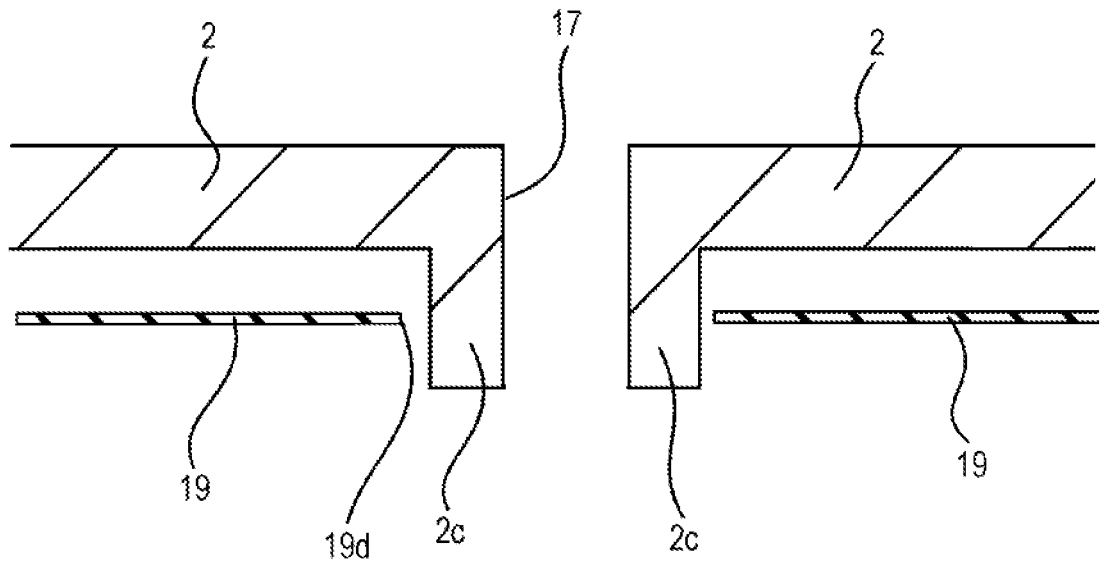
FIG. 15 is a cross-sectional view of the vicinity of the electrolyte injection hole in a prismatic secondary battery according to Modification 3 taken in the longitudinal direction of the sealing plate.

FIG. 15 is a cross-sectional view of the vicinity of the electrolyte injection hole 17 of a prismatic secondary battery according to Modification 3. An annular protrusion 2c protruding toward the electrode body 3 can be provided on the edge of the electrolyte injection hole 17 on the surface of the sealing plate 2 on the electrode body 3 side. The annular protrusion 2c is preferably disposed in the fourth opening 19d provided in the insulating sheet 19. With such a configuration, when injecting electrolyte through the electrolyte injection hole 17, the electrolyte can be prevented effectively from entering between the sealing plate 2 and the insulating sheet 19.

Modification 4

Figure 16:
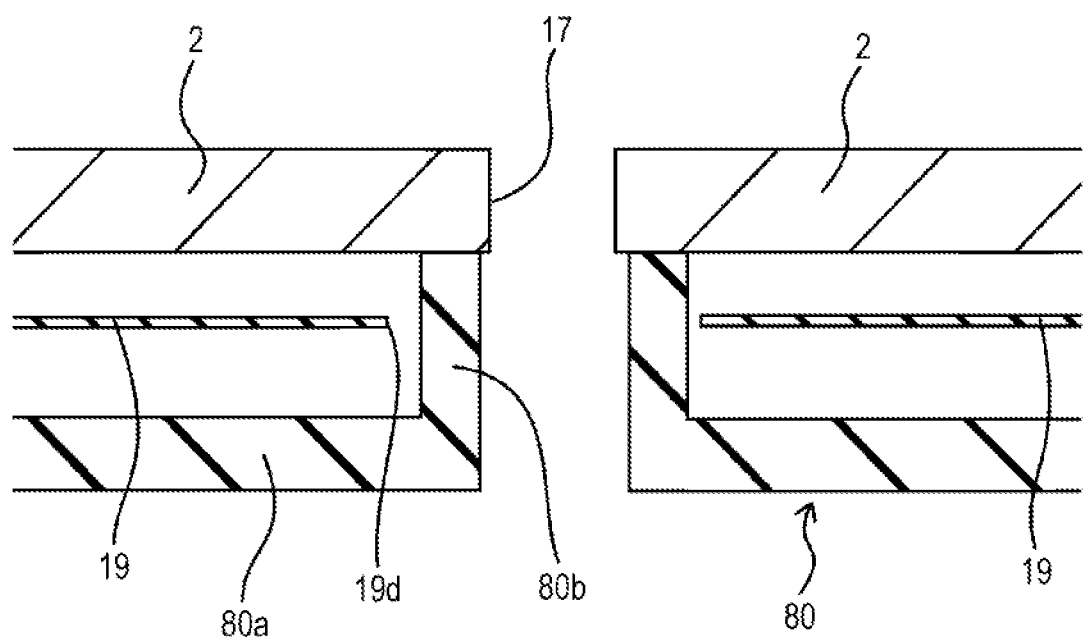
FIG. 16 is a cross-sectional view of the vicinity of the electrolyte injection hole in a prismatic secondary battery according to Modification 4 taken in the longitudinal direction of the sealing plate.

FIG. 16 is a cross-sectional view of the vicinity of the electrolyte injection hole 17 of a prismatic secondary battery according to Modification 4. A resin member 80 is disposed between the insulating sheet 19 and the electrode body 3. The resin member 80 has a plate-like main body portion 80a. The main body portion 80a has an opening at a position facing the electrolyte injection hole 17 and has an annular protruding portion 80b extending from the edge of the opening toward the sealing plate 2. The protruding portion 80b penetrates the fourth opening 19d of the insulating sheet 19 and extends to the sealing plate 2 side of the insulating sheet 19. With such a configuration, when injecting electrolyte through the electrolyte injection hole 17, the electrolyte can be prevented effectively from entering between the sealing plate 2 and the insulating sheet 19. The main body portion 80a preferably extends to a position between the positive electrode collector 6 and the electrode body 3 or between the negative electrode collector 10 and the electrode body 3.

Others

In the above embodiment, the electrode body 3 is composed of two electrode body elements, but the present invention is not limited to this. The electrode body 3 may be composed of three or more electrode body elements. The electrode body elements are not limited to stacked electrode bodies, and may be rolled electrode bodies in which an elongated positive electrode plate and an elongated negative electrode plate are rolled with a separator therebetween. The electrode body 3 may be a single stacked electrode body. Alternatively, the electrode body 3 may be a single rolled electrode body in which an elongated positive electrode plate and an elongated negative electrode plate are rolled with a separator therebetween.

The thickness of the insulating sheet 19 is preferably 0.01 mm to 0.5 mm, more preferably 0.05 mm to 0.2 mm, and still more preferably 0.1 mm to 0.17 mm.

The insulating sheet 19 is preferably a resin sheet. The insulating sheet is preferably made, for example, of polypropylene (PP), polyethylene (PE), polyethylene naphthalate (PEN), polytetrafluoroethylene (PTFE), polyphenylene sulfide (PPS), polyimide, polyester, or polyphenylene ether.

The insulating sheet preferably has a high heat resistance (for example, a melting point of 200 ° C. or higher).

In the above embodiment, the sealing plate is electrically connected to the positive electrode plate. However, an outer side insulating member may be disposed between the positive electrode external conductive member and the sealing plate so that the sealing plate is not electrically connected to the positive electrode plate. In this case, the positive electrode side may have the same structure as the negative electrode side.

In the above embodiment, the positive electrode external conductive member is in direct contact with the sealing plate. Another conductive member may be disposed between the positive electrode external conductive member and the sealing plate.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A prismatic secondary battery comprising:
   an electrode body having a positive electrode plate and a negative electrode plate;
   an outer casing having an opening and accommodating the electrode body;
   a sealing plate sealing the opening;
   a terminal attached to the sealing plate; and
   a collector electrically connecting the positive electrode plate or the negative electrode plate and the terminal,
   wherein an insulating member is disposed between the sealing plate and the terminal,
   wherein an insulating sheet is disposed between the sealing plate and the collector,
   wherein the insulating member and the insulating sheet are between the sealing plate and the electrode body,
   wherein a portion of the insulating member and a portion of the insulating sheet are disposed so as to overlap with each other in a thickness direction of the sealing plate, and
   wherein the portion of the insulating member and the portion of the insulating sheet overlap with a surface of the sealing plate which faces the electrode body in the thickness direction of the sealing plate.

2. The prismatic secondary battery according to claim 1, wherein the insulating sheet has a first opening, and the terminal is disposed in the first opening.

3. The prismatic secondary battery according to claim 2, wherein in the widthwise direction of the sealing plate, the width of the first opening is smaller than the width of the insulating member, and
   wherein in the longitudinal direction of the sealing plate, the width of the first opening is smaller than the width of the insulating member.

4. The prismatic secondary battery according to claim 1, wherein the terminal has a flange portion disposed closer to the electrode body than the sealing plate and an insertion portion that extends from the flange portion to the outside of the battery and penetrates a terminal mounting hole provided in the sealing plate,
   wherein the collector is connected to the surface of the flange portion on the electrode body side, and
   wherein the insulating sheet is disposed between the insulating member and the collector.

5. The prismatic secondary battery according to claim 1, wherein the electrode body includes a first electrode body element including the positive electrode plate and the negative electrode plate and a second electrode body element including the positive electrode plate and the negative electrode plate,
   wherein the first electrode body element has a first tab group electrically connected to the positive electrode plate or the negative electrode plate,
   wherein the second electrode body element has a second tab group electrically connected to the positive electrode plate or the negative electrode plate,
   wherein the first tab group and the second tab group are curved in different directions, and
   wherein the first tab group and the second tab group are connected to the surface of the collector on the electrode body side.

6. The prismatic secondary battery according to claim 5, wherein the collector has a terminal connecting portion connected to the terminal and a tab connecting portion connected to the first tab group and the second tab group,
   wherein in a direction perpendicular to the sealing plate, the distance between the sealing plate and the terminal connecting portion is larger than the distance between the sealing plate and the tab connecting portion, and
   wherein the insulating sheet is sandwiched between the insulating member and the tab connecting portion.

7. A method for manufacturing a prismatic secondary battery including
   an electrode body having a positive electrode plate and a negative electrode plate,
   an outer casing having an opening and accommodating the electrode body,
   a sealing plate sealing the opening,
   a terminal attached to the sealing plate, and
   a collector electrically connecting the positive electrode plate or the negative electrode plate and the terminal,
   an insulating member being disposed between the sealing plate and the terminal,
   the method comprising:
   an insulating sheet disposing step of disposing an insulating sheet such that a portion of the insulating member and a portion of the insulating sheet overlap with each other in a thickness direction of the sealing plate, wherein the insulating member and the insulating sheet are between the sealing plate and the electrode body, and wherein the portion of the insulating member and the portion of the insulating sheet overlap with a surface of the sealing plate which faces the electrode body in the thickness direction of the sealing plate; and
   a collector attaching step of connecting the collector to the terminal such that the insulating sheet is disposed between the sealing plate and the collector.

8. The method for manufacturing a prismatic secondary battery according to claim 7, wherein after a terminal attaching step of attaching the insulating member and the terminal to the sealing plate, the insulating sheet disposing step is performed.

9. The method for manufacturing a prismatic secondary battery according to claim 7, wherein in the insulating sheet disposing step, the insulating sheet is disposed between the sealing plate and the insulating member.

10. The prismatic secondary battery according to claim 1, wherein the insulating sheet is located between the sealing plate and the insulating member.

11. The prismatic secondary battery according to claim 1, wherein the insulating member is located between the sealing plate and the insulating sheet.

12. The method for manufacturing a prismatic secondary battery according to claim 7, wherein the insulating sheet is located between the sealing plate and the insulating member.

13. The method for manufacturing a prismatic secondary battery according to claim 7, wherein the insulating member is located between the sealing plate and the insulating sheet.

14. The prismatic secondary battery according to claim 1,
wherein the sealing plate includes a gas discharge valve provided therein to discharge gas to outside where a pressure inside the outer casing reaches a predetermined value, and
wherein the insulating sheet has an opening disposed at a position corresponding to the gas discharge valve.

15. The prismatic secondary battery according to claim 1,
wherein the sealing plate includes an electrolyte injection hole provided therein through which an electrolyte is injected into the outer casing,
wherein the insulating sheet has an opening disposed at a position corresponding to the electrolyte injection hole.

16. The prismatic secondary battery according to claim 1, further comprising:
a fuse portion provided in the collector,
wherein the insulating member and the insulating sheet are disposed between the fuse portion and the sealing plate.

17. The prismatic secondary battery according to claim 1,
wherein the insulating sheet does not overlap with a portion of the terminal which is disposed between the sealing plate and the electrode body in the thick direction of the sealing plate.

* * * * *